United States Patent
Gottzmann (10) Patent No.: US 6,562,105 B2
(45) Date of Patent: May 13, 2003

(54) COMBINED METHOD OF SEPARATING OXYGEN AND GENERATING POWER

(75) Inventor: Christian Friedrich Gottzmann, Clarence, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/963,492

(22) Filed: Sep. 27, 2001

(65) Prior Publication Data

US 2003/0056647 A1 Mar. 27, 2003

(51) Int. Cl.[7] ............................................... B01D 53/22
(52) U.S. Cl. ................................. 95/54; 95/39
(58) Field of Search ....................... 95/45, 54, 39; 96/4–14

(56) References Cited

U.S. PATENT DOCUMENTS

| | | | | |
|---|---|---|---|---|
| 3,384,154 A | * | 5/1968 | Milton | |
| 5,562,754 A | | 10/1996 | Kang et al. | ............... 95/54 |
| 5,565,017 A | * | 10/1996 | Kang et al. | ............. 95/54 X |
| 5,837,034 A | * | 11/1998 | Keskar et al. | ............... 95/54 |
| 5,837,125 A | * | 11/1998 | Prasad et al. | ............. 95/54 X |
| 5,865,878 A | * | 2/1999 | Drnevich et al. | ............... 95/54 |
| 5,888,272 A | * | 3/1999 | Prasad et al. | ............... 95/54 |
| 5,935,298 A | * | 8/1999 | Prasad et al. | ............. 95/54 X |
| 5,954,859 A | | 9/1999 | Keskar et al. | ............... 95/54 |
| 5,964,922 A | | 10/1999 | Keskar et al. | ............... 95/39 |
| 5,976,223 A | * | 11/1999 | Prasad et al. | ............... 95/54 |
| 6,010,614 A | * | 1/2000 | Keskar et al. | ............. 95/54 X |
| 6,077,323 A | * | 6/2000 | Nataraj et al. | ............. 95/54 X |
| 6,106,591 A | * | 8/2000 | Keskar et al. | ............... 95/54 |
| 6,114,400 A | * | 9/2000 | Nataraj et al. | ............. 95/54 X |
| 6,117,210 A | * | 9/2000 | Prasad et al. | ................ 95/54 |
| 6,139,604 A | * | 10/2000 | Gottzmann et al. | ........... 96/4 X |
| 6,149,714 A | * | 11/2000 | Kobayashi | ..................... 95/54 |
| 6,214,066 B1 | * | 4/2001 | Nataraj et al. | ............. 95/54 X |
| 6,360,524 B1 | * | 3/2002 | Drnevich et al. | ............ 96/4 X |
| 6,406,518 B1 | * | 6/2002 | Bonaquist et al. | ............. 95/54 |

FOREIGN PATENT DOCUMENTS

WO     WO98/55393     12/1998

* cited by examiner

Primary Examiner—Robert H. Spitzer
(74) Attorney, Agent, or Firm—David M. Rosenblum (57) ABSTRACT

A combined method of separating oxygen and for generating power. Oxygen containing stream is compressed and oxygen is separated from the stream into permeate oxygen and an oxygen depleted retentate in an oxygen transport membrane unit. An anode side of the oxygen transport membrane unit is purged with a pressurized purge stream made up of pressurized, superheated steam. A pressurized oxygen product stream is discharged from the anode side of the oxygen transport membrane, the product comprising permeated oxygen and steam. The pressurized oxygen product stream is cooled against itself or the oxygen containing stream. The pressurized oxygen product stream is condensed by indirect heat transfer with a process fluid that boils to allow power to be extracted from the process fluid. Condensed water is separated from the oxygen product stream and separated oxygen is extracted as a product at pressure.

19 Claims, 4 Drawing Sheets

COMBINED METHOD OF SEPARATING OXYGEN AND GENERATING POWER

FIELD OF THE INVENTION

The present invention relates to a combined method of separating oxygen from an oxygen containing gas and generating power. More particularly, the present invention relates to such a combined method in which the oxygen is separated by an oxygen transport membrane purged with superheated steam and the power is generated through a Rankine cycle. Even more particularly, the present invention relates to such a combined method in which heat is transferred from an oxygen product stream produced by the oxygen transport membrane to a process fluid used within the Rankine cycle.

BACKGROUND OF THE INVENTION

Integration of power and oxygen generation cycles involving the use of oxygen transport membranes are particularly attractive from the standpoint of thermal efficiency. This is because oxygen transport membranes are effective to separate oxygen in a temperature range that encompasses the high temperatures involved in many power generation cycles.

Oxygen transport membranes are formed from a variety of well known ceramics, for example, perovskites and perovskite-like materials. At a high temperature, between about 400° C. and about 1000° C., such ceramics are capable of conducting oxygen ions while remaining impervious to oxygen molecules and substances containing oxygen in a combined form. In an oxygen transport membrane, the oxygen in an oxygen containing gas ionizes on a cathode side of the membrane. The oxygen ions can be transported across the membrane under the impetus of a positive ratio of partial oxygen pressures applied across the membrane. The oxygen ions emerging at the opposite, anode side of the membrane, recombine to liberate electrons that are used to ionize the oxygen at the cathode of the membrane. In some materials, known as mixed conductors, the electrons are transported back to the cathode directly within the ceramic. In dual phase conductors, electrons are conducted by a metallic phase or electron conducting ceramic phase located within the ceramic.

Application of a countercurrent (to the direction of retentate side flow) steam purge to the anode of an oxygen transport membrane lowers the oxygen partial pressure along the length of the membrane to increase the driving force for oxygen transport. This permits higher oxygen recovery and/or a more efficient cycle in that the degree of compression of cathode side gases or anode side gases that otherwise would be necessary to produce the driving force is reduced and can permit withdrawing an oxygen product at elevated pressure. The molar ratio of steam to oxygen at the anode side exit of the oxygen transport membrane unit determines the maximum pressure at which the oxygen product can be recovered; the higher the ratio the higher the possible oxygen product pressure. Unfortunately significant reductions in the partial pressure of oxygen at the anode and or high oxygen product pressures require high ratios of steam to oxygen. For instance, at a retentate or cathode side air pressure of 12 Bar the partial oxygen pressure at the cathode or retentate side inlet will be about 2.4 Bar. At a minimum partial oxygen pressure ratio (driving force for ion transport across the membrane) of 1.5 at the pinch point, the corresponding required partial oxygen pressure at the permeate side will be about 1.6 Bar. If, for instance it is desired to recover oxygen at a pressure of 6 bar, the steam to oxygen molar ratio has to be about (6−1.6)/1.6=2.75.

To recover oxygen at pressure, the permeate product stream, that consists of steam and oxygen, is cooled to condense the steam against a heat sink such as cooling water. Unfortunately, the amount of heat required to generate the large quantities of steam makes the process economically unattractive because the latent heat of condensation cannot be recovered effectively. If the steam-oxygen mixture is expanded in a turbine, the oxygen is recovered at low pressure. This is a problem when the oxygen product is subsequently required at high pressure and requires recompression. Also if one wants to avoid compressing oxygen from a high vacuum level, a significant fraction of the power producing potential, that can be recovered in the turbine, is lost.

For instance, in U.S. Pat. No. 5,562,754, air is compressed and heated in an in-line combustor. The oxygen is separated from the air in an oxygen transport membrane to produce a retentate. A stream of the retentate is expanded in a gas expander that is used to drive the air compressor and optionally, an electric generator. A steam purge is used at the anode side to produce an oxygen product containing steam that is used to preheat the feed water. Aside from such preheating, the latent heat of condensation is not recovered in the illustrated cycle and is thereby lost to the cycle. In U.S. Pat. No. 5,964,922, water is pressurized by pumping and then used as a steam purge for an oxygen transport membrane. The pressurized oxygen product that contains both permeated oxygen and steam is cooled in a water cooled or air cooled condenser to allow water to be condensed from the steam and recycled. As a result, the latent heat of condensation is thereby lost to the cooling mediums. U.S. Pat. No. 5,954,859 discloses purging the permeate side of an oxygen transport membrane with a high pressure purge gas stream containing steam to produce a high pressure gas stream containing oxygen and steam. The resultant stream is introduced into a turbine to recover shaft work. Hence if thereafter, the stream or portions of it were required at high pressure, it would require recompression with a concomitant energy outlay.

As will be discussed, the present invention encompasses an energy efficient method of producing an oxygen product stream at pressure that allows for the recovery of work from the latent heat of condensation of steam contained in such product stream. Other advantageous aspects of the present invention will become apparent from the following discussion.

SUMMARY OF THE INVENTION

The present invention provides a combined method of separating oxygen from an oxygen containing gas and generating power. In accordance with a method of the present invention, oxygen is separated from the oxygen containing gas into permeated oxygen and an oxygen depleted retentate by an oxygen transport membrane unit. The oxygen transport membrane unit includes at least one oxygen transport membrane operating at an elevated operational temperature and having a cathode side and an anode side. The anode side of the at least one oxygen transport membrane is purged with a pressurized purge stream comprising pressurized, superheated steam. A pressurized oxygen product stream is discharged from the anode side of the at least one oxygen transport membrane. The pressurized oxygen product stream comprises the permeated oxygen and the steam. At least part of the steam in the pressurized oxygen product stream is condensed by transferring heat to a process fluid that boils at a boiling temperature lower than the condensing temperature of the steam contained in the oxygen product stream. As a result, the process fluid boils and the at least part of the steam within the pressurized oxygen product stream condenses. The condensed water is separated from the pressurized oxygen product stream and energy is extracted from the process fluid as shaft work.

Preferably, the oxygen containing gas is heated prior to its being subjected to oxygen separation within the oxygen transport membrane unit. A retentate stream composed of the oxygen depleted retentate can be heated in an inline combustor by combustion of fuel supported by at least a portion of residual oxygen contained in the retentate stream to produce a heated retentate stream. The oxygen containing stream is at least partially heated by indirect heat transfer from the heated retentate stream.

The oxygen containing gas can be air that can be compressed to form a compressed air stream. A retentate stream composed of the oxygen depleted retentate can be expanded in a gas expander. Also the retentate stream can be cooled and then expanded in the gas expander to reduce its capital cost by allowing use of lower cost materials. Preferably the gas expander can then drive an air compressor to compress the oxygen containing gas. Alternately to increase power output the retentate stream can be further heated by combustion in an in-line combustor and then expanded in the gas expander.

A compressed air stream can be divided into first and second subsidiary air streams. The first subsidiary air stream can be heated through indirect heat exchange with the pressurized oxygen product stream and the second subsidiary air stream is heated separately from the first subsidiary air stream. The first and second subsidiary streams are combined prior to their being introduced into the oxygen transport membrane unit.

The separation of oxygen from the oxygen containing stream produces a retentate at the cathode side of the at least one oxygen transport membrane. A retentate stream composed of at least a portion of the oxygen depleted retentate can be introduced into an oxygen transport membrane combustor and deoxo unit so that further oxygen is separated from the retentate stream to form further permeated oxygen.

The pressurized purge stream is formed by pumping a combined water stream formed of recycled and, if necessary make-up water pumping only has to overcome pressure drop in the purge circuit. The combined water stream is vaporized and at least partially superheated to form an at least partially superheated purge stream. The combined water stream is vaporized and at least partially superheated by combusting a first fuel stream and transferring the heat of combustion to the combined water stream. A second fuel is introduced into the at least partially superheated purge stream, thereby to form the pressurized purge stream. At least a portion of the pressurized purge stream is further heated and then introduced into the oxygen transport membrane combustor and deoxo unit so that fuel reacts with the further permeated oxygen to produce heat and products of combustion. The heat can be used to at least partially heat the products of combustion and, by indirect heat transfer, at least a portion of the compressed air feed. Preferably the products of combustion are added to the pressurized purge stream to increase the volume of gases for purging the anode of said oxygen transport membrane. This reduces further the partial oxygen pressure at the anode of the oxygen transport membrane unit and also allows complete oxidation of residual fuel and partial oxidation products carried over from the oxygen transport membrane combustor.

The oxygen transport membrane combustor and deoxo unit produces a further oxygen depleted retentate. A further retentate stream composed of the further oxygen depleted retentate can be divided into first and second subsidiary retentate streams. The first subsidiary retentate stream can be expanded in a gas expander to generate power to drive said air compressor. The second subsidiary retentate stream can be recovered as a pressurized nitrogen product. The first subsidiary retentate stream can be further heated by combustion within an in-line combustor prior to expansion. Part of the second subsidiary air stream can be combined with the first subsidiary retentate stream upstream of the in-line combustor to support combustion of a fuel and thereby to add further heat and mass to the first subsidiary retentate stream prior to its being expanded.

In any embodiment of the present invention, the process fluid can be water and the steam in the pressurized purge stream can be at a higher pressure than the process fluid. The power can then be extracted from the process fluid in a Rankine cycle in which the process fluid is pumped in the form of the liquid condensate to a pressure lower than that of the purge stream to create a pressurized liquid. The pressurized liquid is vaporized by indirect heat exchange with at least part of the condensing steam in the purge stream in a reboiler-condenser. The process fluid can be superheated and the process stream can be expanded in a steam turbine after having been superheated. The power can be extracted from shaft work created in the turbine. Thereafter the process fluid exhausting from the steam turbine can be condensed to produce the liquid condensate.

The pressurized purge stream can at least be made up of recycled water and, if necessary make-up water to form the water stream. It should be noted that, if products of combustion are added to the pressurized purge stream, the water from the products of combustion may produce a surplus of water requiring removal of this excess.

The water stream can be vaporized and superheated to form the pressurized purge stream. At least a portion of the heat required for the vaporization and superheating of the water stream can be provided by combustion in a boiler-superheater. The process fluid is superheated by the combustion within the boiler-superheater.

The water for the pressurized purge stream can be pumped, vaporized, and superheated to form the pressured purge stream. The pressurized purge stream thus formed can be expanded in a turbine to produce additional power. After expansion, the pressurized purge stream can be reheated and used to purge the anode side of the at least one oxygen transport membrane. The pressurized purge stream is indirectly heated along with said first subsidiary air stream by the oxygen product stream. Fuel can be added to the pressurized purge stream after having been expanded. Thereafter, the pressurized purge stream is introduced into the oxygen transport membrane combustor deoxo unit as a reactive purge to produce heat and products of combustion which together with steam contained in said pressurized purge stream are used to purge the anode side of the at least one oxygen transport membrane.

The steam turbine of the Rankine cycle can operate at an exhaust pressure of significantly less than about 14.7 psia since the condensing temperature is only limited by the temperature of cooling media in the condenser. At least a portion of the heat for vaporizing and superheating said purge steam can be provided by recovery of heat from the exhaust of the expander.

In the present invention since the pressurized oxygen product stream is not simply expanded to extract power, but rather, is used to supply heat to a Rankine cycle, a pressurized oxygen product that is saturated with water can be produced or a pressurized oxygen-steam mixture produced at a desired steam/oxygen molar ratio. If required the moisture saturated oxygen stream can be dried by conventional means. Steam oxygen mixtures can be used in downstream processes such as coal gasification or autothermal reformers. Withdrawing product at elevated pressure reduces or eliminates capital and energy intensive oxygen compression. At the same time, energy can be efficiently extracted by the Rankine steam cycle.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

In order to avoid repetition and simplify the discussion of the drawings, the same reference numbers have been used in the various figures to designate like components. For additional purposes of clarity, the overall systems have been simplified by not illustrating minor process components such as feed water heaters, feed water treatment systems, and economizer heat exchangers.

DETAILED DESCRIPTION

Figure 1:
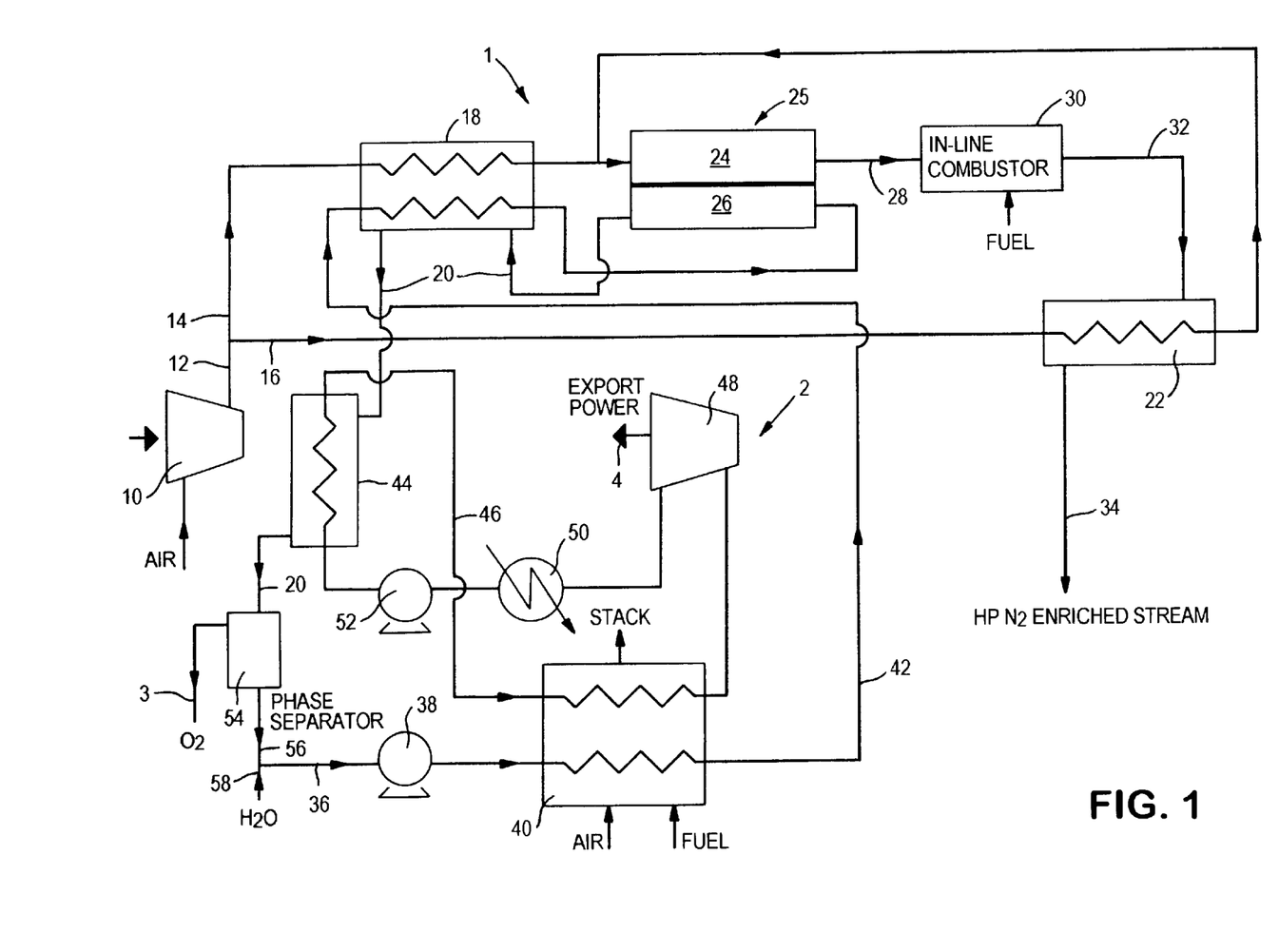
FIG. 1 is a schematic process flow diagram of apparatus to carry out a method in accordance with the present invention.

With reference to FIG. 1, a process flow diagram is disclosed of carrying out a combined method in accordance with the present invention for separating oxygen from an oxygen containing gas and generating power. The combined method includes an oxygen separation system 1 that is integrated with a Rankine steam cycle 2. The integration produces an oxygen product saturated with water 3 and export power indicated by reference number 4.

With respect to oxygen separation system 1, an oxygen containing gas, air, is compressed in an air compressor 10 to form a compressed air stream 12. Compressed air stream 12 is divided into a first subsidiary air stream 14 and a second subsidiary air stream 16. First subsidiary air stream 14 is heated in a heat exchanger 18 through indirect heat exchange with a pressurized oxygen product stream 20. Second subsidiary air stream 16 is heated in a heat exchanger 22 by indirect heat exchange with a heated retentate stream 32 to be discussed hereinafter and then combined with a first subsidiary air stream 18.

The combined streams are then introduced into a cathode side 24 of an oxygen transport membrane unit 25. Oxygen transport membrane unit 25 contains one or more ceramic, oxygen transport membranes that separate oxygen from an oxygen containing feed by ion transport through the membrane. Oxygen within the oxygen containing feed ionizes on the cathode side. The oxygen ions are transported through the membranes to an anode side of the membranes in which the oxygen ions reconstitute into oxygen giving up electrons which are used in the ionization of oxygen. Preferably, the membranes are mixed conducting and, comprised of known metal oxides, that conduct both the oxygen ions and the electrons or of multiple phases of ion conducting metal oxides and electron conducting metal oxides or metals. As mentioned above, such membranes function at elevated temperatures and under the driving force of a positive ratio of partial oxygen pressures at the cathode and anode sides respectively. The membranes can be planar surfaces or tubes and can either be formed as thicker dense walls or thin films supported by a porous matrix.

In oxygen transport membrane 25, oxygen is separated and is reconstituted at the anode side 26 thereof. The separation of oxygen produces an oxygen depleted retentate at cathode side 24 of oxygen transport membrane unit 25. The oxygen depleted retentate so formed contains some oxygen, typically between about 3% and about 8%. A retentate stream 28 is introduced into an in-line combustor 30 and residual oxygen within retentate stream 28 supports combustion of a fuel to form heated retentate stream 32. Heated retentate stream 32 that is introduced into heat exchanger 22 to heat second subsidiary air stream 16. This compensates for heat leakage and cold end thermal losses in heat exchangers 18 and 22. The heated retentate stream 32 is discharged from the process as a high pressure nitrogen enriched stream 34 after extracting useful heat in heat exchanger 22.

As may be appreciated, an embodiment of the present invention is possible in which all of the incoming air were heated to membrane operating temperature by in-line combustor 30 to help heat ceramic membrane unit 25 to its operational temperature. In this regard, in the illustrated embodiment, ceramic membrane unit 25 is maintained at its elevated operational temperature in large part by the heat added to the system by in-line combustor 30.

A water stream 36, comprising recycled condensate 56 and if necessary to compensate for losses, make-up water, is pumped by a pump 38 and then introduced into a fuel and air fired boiler-superheater 40 to produce a pressurized purge stream 42 in a superheated state. Pressurized purge stream 42 is preferably further heated within heat exchanger 18 to near membrane operating temperature, although it is possible to perform all required heating within air fired boiler-superheater 40.

Pressurized purge stream 42 purges the anode side 26 of oxygen transport membrane unit 25 to produce the pressurized oxygen product stream 20. Pressurized purge stream 42 sweeps permeated oxygen from the oxygen transport membranes of oxygen transport membrane unit 25 to lower the partial pressure of oxygen on anode side 26 and thereby reduce the compression requirements. In fact, embodiments of the present invention are possible in which there is no appreciable amount of compression required. At the same time, the pressurized steam produces pressurization within pressurized oxygen product 20.

Pressurized oxygen product stream 20 is partially cooled within heat exchanger 18. It is then introduced into boiler condenser 44 where at least a portion of the contained steam condenses giving up heat to the boiling process fluid. In Rankine steam cycle 2, a process fluid stream 46, advantageously made up of steam, is superheated within fuel and air fired boiler-superheater 40 and expanded within a steam turbine 48 to produce export power 4. Preferably, process stream 46 is expanded to a high vacuum pressure level, typically between 0.5 and 3 psia, within steam turbine to maximize power production. Process stream 46 is then condensed within a condenser 50, cooled by cooling water or air and as a liquid condensate is then pressurized by use of a pump 52. After having been pressurized, process stream 46 is then converted to steam within reboiler-condenser 44 and superheated in boiler-superheater 40. Pressurized oxygen product stream 20 is at a higher pressure and therefore higher temperature than process stream 46 within reboiler-condenser 44 such that the heat of condensation of the condensing steam portion of pressurized oxygen product can be transferred to the process fluid side to vaporize water in the Rankine cycle circuit.

Preferably, the temperature difference between pressurized oxygen product stream 20 and process stream 46 is kept small, typically between about 3 and about 10° C. This prevents significant loss of energy potential without incurring large capital penalties in reboiler-condenser 44 since heat transfer film coefficients are high in boiling and condensing water. The high heat transfer film coefficients for boiling and condensing water can be enhanced by well established techniques such as porous boiling surfaces, such as described in U.S. Pat. No. 3,384,154 and/or fluted boiling and condensing surfaces which are self enhancing by exploiting surface tension of the liquid phase to draw liquid feed or condensate respectively into preferred channels and thereby to provide a thin liquid film over the major portion of the heat transfer area.

Oxygen product stream 20 now containing liquid water can be introduced into a phase separator 54 to produce the oxygen product 3 and a water stream 56 that can be combined with a make-up water stream 58, if necessary, to produce water stream 36. Make-up water stream 58 compensates for any water losses from the Rankine cycle circuit. An advantageous feature of the present invention is that it is very easily adapted to produce an oxygen-steam mixture product at a controlled molar ratio. This can be particularly important where a downstream process requires an oxygen-steam mixture with a predetermined steam content. In this regard, although not illustrated, a controlled portion of oxygen product stream 20 can by-pass reboiler-condenser 44 and then be returned to oxygen product stream 20 downstream of reboiler condenser 44. If the amount that is by-passed or diverted is controlled, the amount of steam within oxygen product stream 20 will also be controlled.

Figure 2:
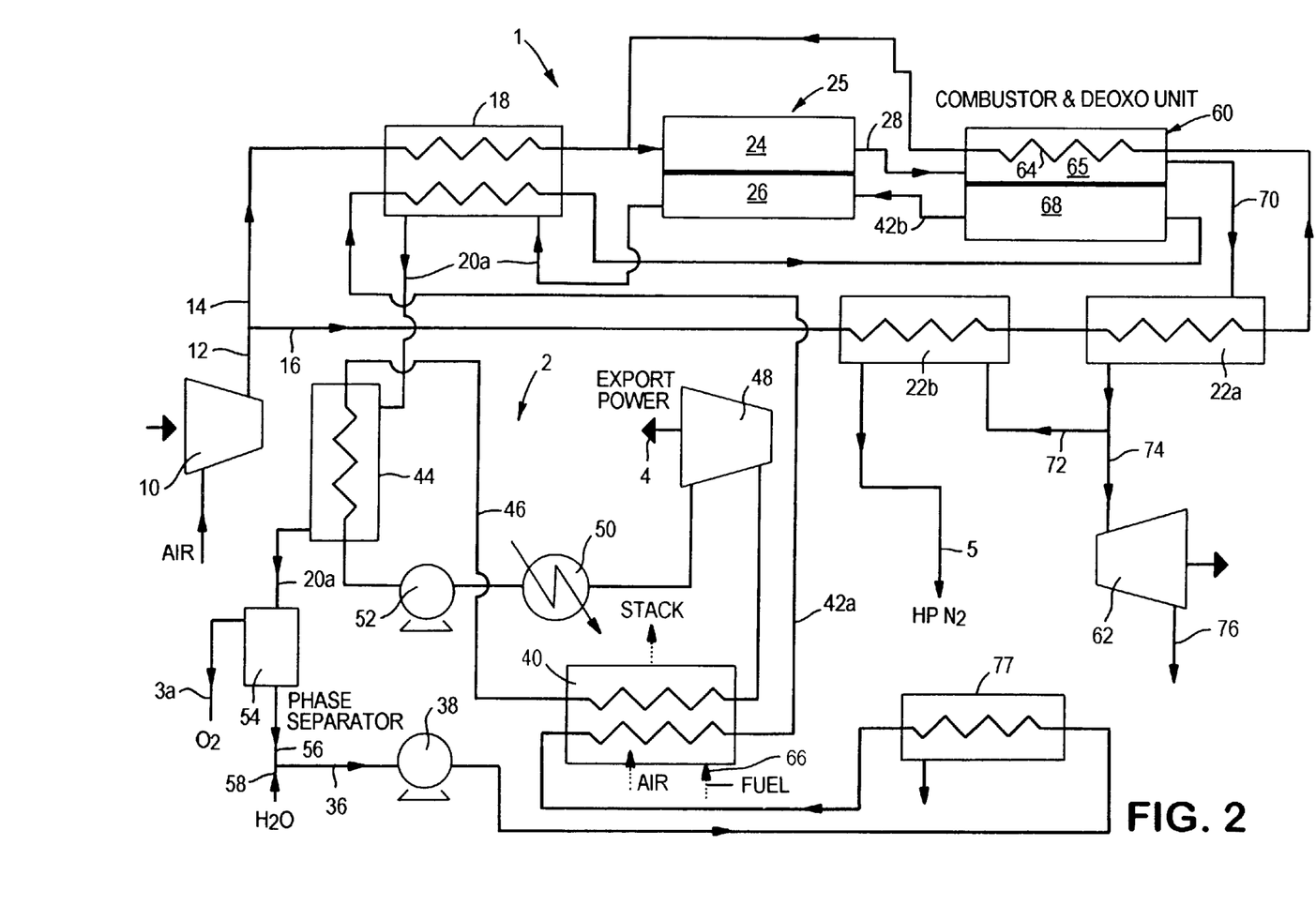
FIG. 2 is a schematic illustration of an alternative embodiment of the present invention incorporating an oxygen transport membrane combustor and deoxo unit to allow for production of a high purity nitrogen product.

With reference to FIG. 2, a process flow diagram of an alternative embodiment in accordance with the present invention is illustrated. It utilizes a known oxygen transport membrane combustor and deoxo unit 60 to produce an additional high purity nitrogen stream 5. Further power is produced in a gas expander 62 which can be used to drive air compressor 10.

Air after having been compressed to between about 6 and 20 bar within air compressor 10 forms a compressed air stream 12 which is split into first and second subsidiary air streams 14 and 16. Second subsidiary air stream 16 which is a major portion of the air feed is heated within heat exchangers 22a and 22b and is then further heated within an oxygen transport membrane combustor and deoxo unit 60 to slightly above the temperature of oxygen transport membrane unit 25, namely, between about 750° C. and about 1000° C. Second subsidiary air stream 16 is then combined with first subsidiary air stream 14 and introduced into the cathode side 24 of oxygen transport membrane unit 25.

Oxygen transport membrane combustor and deoxo unit 60 contains a heat exchanger 64 within its cathode side 65 to further heat second subsidiary air stream 16 after having been heated within heat exchangers 22a and 22b. A pressurized purge stream 42a is preheated in heat exchanger 18. Additionally, fuel 66 is added to pressurized purge stream 42a before or after heat exchanger 18 to produce a fuel containing pressurized purge stream 42a which after having been heated within heat exchanger 18 is introduced into the cathode side 68 of oxygen transport membrane combustor and deoxo unit 60. Optionally a portion of pressurized purge stream 42a can by-pass oxygen transport combustor 60. Oxygen transport membrane combustor and deoxo unit 60 contains ceramic oxygen transport membranes which are effective for separating residual oxygen within retentate stream 28. Oxygen permeate within anode side 68 reacts with the fuel within fuel containing pressurized purge stream 42a to further lower the partial pressure of oxygen to a very low level on the anode side thereof, substantially below that obtainable with the steam purge alone, so that residual oxygen content of the retentate can be reduced to a very low level. Optionally the reaction on the anode side can be enhanced by an oxidation catalyst located on or adjacent to the anode surface. Preferably, 60 to 80 percent of the oxygen is separated within oxygen transport membrane unit 25, the remainder within oxygen transport membrane combustor and deoxo unit 60.

A pressurized stream 42b, which consists of pressurized purge stream 42a and oxidation products, is discharged from anode side 68 of combustor deoxo unit 60 and introduced to the anode side 26 of oxygen transport membrane unit 25. Pressurized stream 42b acts to purge oxygen from the anode side 26 and to form a pressurized oxygen product stream 20a which would in addition to oxygen and steam contain the products of combustion of the fuel. As in the previous embodiment, pressurized oxygen product stream 20a is introduced into reboiler-condenser 44 so that most of the steam condenses and the stream 20a is thereupon introduced into phase separator 54 to produce an oxygen product stream 3a which is saturated with water and contains carbon dioxide from combustion of the fuel. In this regard, oxygen product stream 3a can typically contain about 90% by volume oxygen and about 10% by volume carbon dioxide. The product oxygen can be used as is, if compatible with downstream applications or separated into oxygen and by-product carbon dioxide by known means.

After retentate stream 28 is introduced into oxygen transport membrane combustor and deoxo unit 60, a retentate stream 70 is produced that contains very low levels of oxygen. Retentate stream 70 is introduced into heat exchanger 22a and preferably cooled to about 750° C. so as to allow use of a gas expander that does not require exotic, expensive high temperature resistant components. Retentate stream 70 is divided into first and second subsidiary retentate streams 74 and 72. Further heat is transferred between second subsidiary retentate stream 72 and second subsidiary air stream 16 within heat exchanger 22b to form the high purity nitrogen product stream 5. First subsidiary retentate stream 74 is then expanded within gas expander 62 that drives air compressor 10 and the resultant exhaust stream 76 is introduced into heat exchanger 77 to preheat and partially vaporize water stream 36 after having been pressurized. Thereafter, exhaust stream 76 is then discharged from the system as a low pressure nitrogen product. Pressurized water stream 36 after having been partially vaporized within heat exchanger 77 is fully vaporized and partially superheated within air fired boiler 40 to produce pressurized purge stream 42a. Additionally, pressurized process stream 46 is superheated in air fired boiler 40.

It is to be noted that in any embodiment of the present invention, the retentate could be partly recovered as a high pressure product and partly expanded for power recovery purposes.

Figure 3:
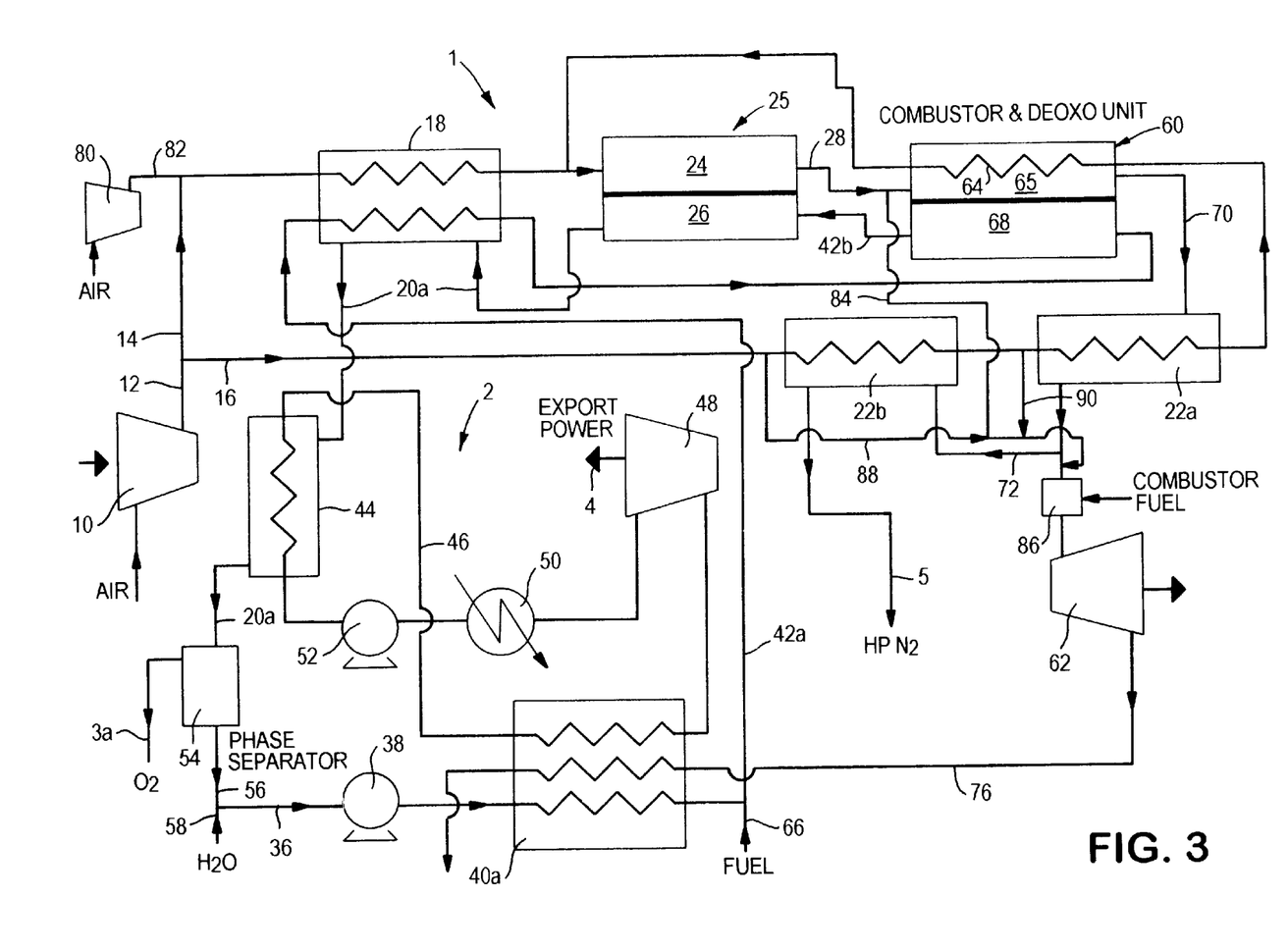
FIG. 3 is an alternative embodiment of FIG. 2 in which a combined stream of nitrogen retentate and air is subjected to in-line combustion and energy is extracted from the combined stream by a gas expander.

With reference to FIG. 3, a method of the present invention is illustrated by a process flow diagram that is similar to that shown in FIG. 2 but has the objective to increase the power produced by the expansion of air and retentate gases. In this embodiment a supplementary air compressor 80 is provided to produce a supplementary air stream 82 that is combined with first subsidiary air stream 14 to compensate for the gas volume that is withdrawn from the cycle. Additionally, a portion 84 of retentate stream 28 bypasses the combustor deoxo unit 60 and flows directly to a combustor 86 that is situated upstream of gas expander 62. Optionally air streams 88 and 90 may be added to portion 84 of retentate stream 28 before and after heat exchanger 22b, respectively, so as to increase the mass being expanded. In the specific embodiment of FIG. 3 heat input to a boiler-superheater 40a is solely provided by the heat contained within exhaust stream 76 from gas expander 62. Gas expander 62 can drive the air compressors of the system and produce additional export power. As may be appreciated, the additional heat addition ahead of the turbine by use of in-line combustion and having part of the air by-pass the separator portion of the system could be used in any embodiment of the present invention.

Figure 4:
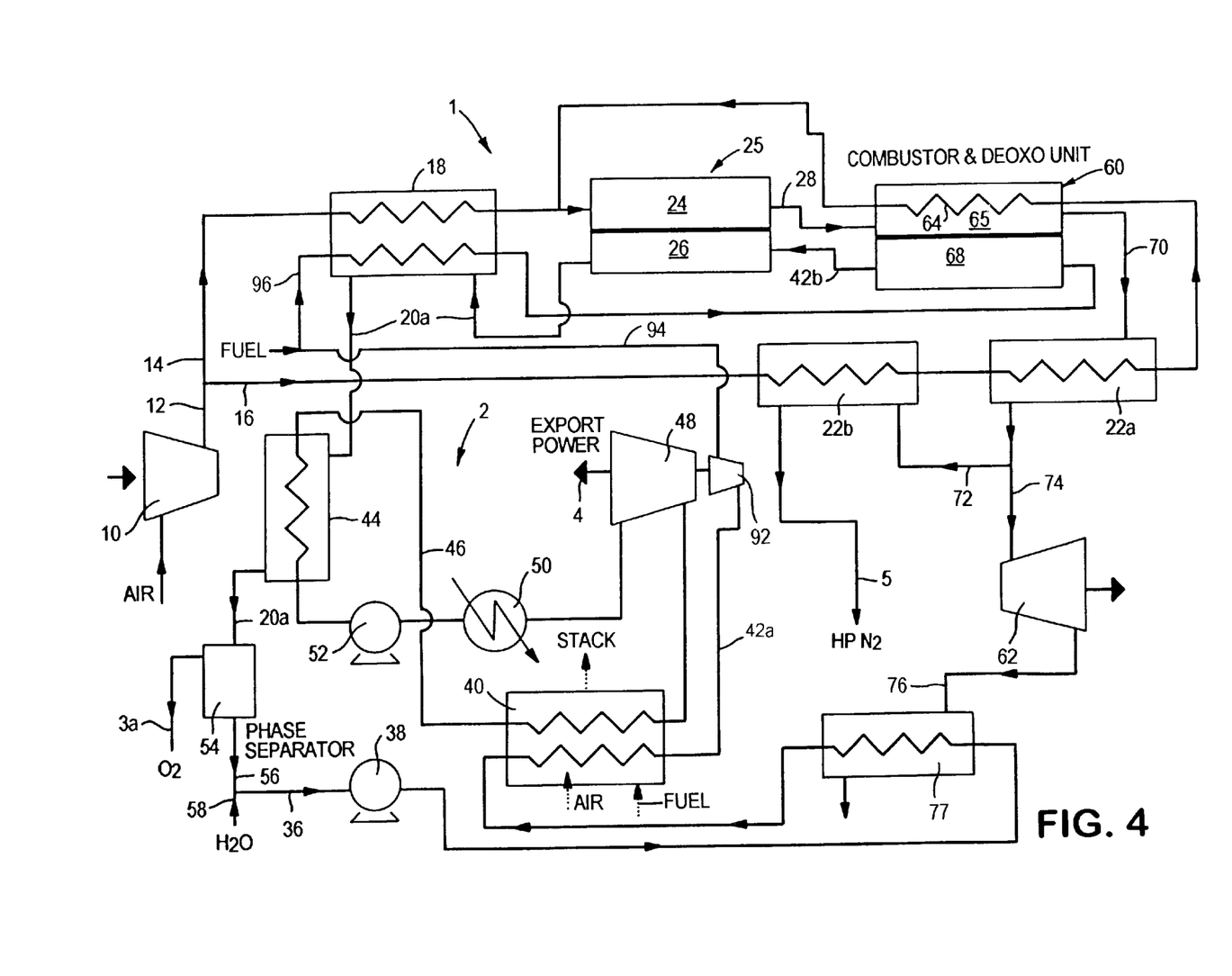
FIG. 4 is an alternative embodiment of FIG. 2 in which a steam purge stream is expanded with the performance of work to produce export power.

With reference to FIG. 4, pump 38 pumps water stream 36 to a higher pressure that can be in a range of between about 15 to about 60 bar. Water stream 36, after having been thus highly pressurized, is then pre-heated and vaporized in heat exchanger 77 and air fired boiler 40 to generate a pressurized purge stream 42a that consists of high pressure, superheated steam. Pressurized purge stream 42a is expanded from a high pressure to an intermediate pressure within a steam turbine 92 with the exhaust from steam turbine 92, as an exhaust stream 94, introduced to the anode side 68 of oxygen transport membrane combustor-deoxo unit 60 after further heating and fuel injection as in the process of FIG. 2. The remainder of the pressurized oxygen product and the process fluid Rankine cycle circuits are identical to those shown in FIG. 2. The amount of superheating of pressurized purge stream 42a should be sufficient to avoid liquid droplet formation during turbine expansion.

As may be appreciated by those skilled in the art, while the present invention has been described with reference to preferred embodiments, numerous additions, omissions and changes may be made without departing from the spirit and scope of the present invention as set forth in the appended claims.

I claim:

1. A combined method of separating oxygen from an oxygen containing gas and generating power, said method comprising:

separating oxygen from the oxygen containing gas into permeated oxygen and an oxygen depleted retentate stream in an oxygen transport membrane unit including at least one oxygen transport membrane operating at an elevated operational temperature and having a cathode side and an anode side;

purging the anode side of the at least one oxygen transport membrane with a pressurized purge stream comprising pressurized, superheated steam;

discharging a pressurized oxygen product stream from said anode side of said at least one oxygen transport membrane, said pressurized oxygen product stream comprising said permeated oxygen and said steam;

condensing at least part of the steam in said pressurized oxygen product stream by transferring heat to a process fluid that boils at a boiling temperature lower than the condensing temperature of the steam contained in the pressurized oxygen product stream so that the process fluid boils and the at least a portion of the steam within the pressurized oxygen product stream condenses;

separating condensed water from said pressurized oxygen product stream; and extracting energy from the process fluid as shaft work.

2. The method of claim 1, wherein the oxygen containing gas is heated prior to its being subjected to oxygen separation within the oxygen transport membrane unit.

3. The method of claim 2, wherein:

a retentate stream composed of said oxygen depleted retentate is heated in an in-line combustor by combustion of fuel supported by at least a portion of residual oxygen contained in said retentate stream to produce a heated retentate stream; and the oxygen containing gas is at least partially heated by indirect heat transfer from said heated retentate stream.

4. The method of claim 1 wherein:

said oxygen containing gas is air;

said oxygen containing gas is compressed to form a compressed air stream; and a retentate stream composed of said oxygen depleted retentate is expanded in a gas expander.

5. The method of claim 4 wherein:

said retentate stream is cooled and then expanded in said gas expander; and said gas expander drives an air compressor to compress said oxygen containing gas.

6. The method of claim 4 wherein the retentate stream is further heated by combustion of fuel in an in-line combustor and then expanded in said gas expander.

7. The method of claim 6 wherein part of said compressed air stream is combined with said retentate stream upstream of said in-line combustor to support combustion of additional fuel and thereby to add further heat and mass to said retentate stream prior to the expansion.

8. The method of claim 1, wherein:

said oxygen containing gas is air;

the air is compressed to form a compressed air stream;

the compressed air stream is divided into first and second subsidiary air streams;

said first subsidiary air stream is heated through the indirect heat exchange with the pressurized oxygen product stream;

the second subsidiary air stream is heated separately from the first subsidiary air stream; and the first and second subsidiary streams are combined prior to their being introduced into the oxygen transport membrane unit.

9. The method of claim 8, wherein:

a retentate stream composed of said oxygen depleted retentate is heated in an in-line combustor by combustion of fuel supported by at least a portion of residual oxygen contained in said retentate stream to produce a heated retentate stream; and said second subsidiary air stream is heated by indirect heat exchange with the heated retentate stream.

10. The method of claim 8, wherein:

the separation of the oxygen from the oxygen containing stream produces a retentate at said cathode side of the at least one oxygen transport membrane;

a retentate stream composed of at least a portion of the oxygen depleted retentate is introduced into an oxygen transport membrane combustor and deoxo unit so that further oxygen is separated from said retentate stream to form further permeated oxygen;

a water stream formed at least of recycled water is pumped;

said water stream is vaporized and at least partially superheated to form an at least partially superheated purge stream;

the water stream being vaporized and at least partially superheated by combusting a first fuel stream and transferring a heat of combustion to the water stream;

a second fuel is introduced into said at least partially superheated purge stream, thereby to form said pressurized purge stream;

the pressurized purge stream is further heated and then introduced to the oxygen transport membrane combustor and deoxo unit so that fuel reacts with said further permeated oxygen to produce heat and products of combustion; and the heat produced in the oxygen transport membrane combustor and deoxo unit raises the temperature of said pressurized purge stream and, by indirect heat transfer, the temperature of said second subsidiary air stream.

11. The method of claim 10 wherein:

said oxygen transport membrane combustor and deoxo unit produces a further oxygen depleted retentate;

a further retentate stream composed of the further oxygen depleted retentate is divided into first and second subsidiary retentate streams;

the first subsidiary retentate stream is expanded in a gas expander to generate power to drive said air compressor; and said second subsidiary retentate stream is recovered as a pressurized nitrogen product.

12. The method of claim 10 wherein:

said oxygen transport membrane combustor and deoxo unit produces a further oxygen depleted retentate;

a further retentate stream composed of the further oxygen depleted retentate is divided into first and second subsidiary retentate streams;

the first subsidiary retentate stream is further heated by combustion within an in-line combustor; and the first subsidiary retentate stream is expanded in a gas expander to generate power to drive said air compressor.

13. The method of claim 12 wherein part of said second subsidiary air stream is combined with said first subsidiary retentate stream upstream of said in-line combustor to support combustion of a fuel and thereby to add further heat and mass to said retentate stream prior to its being expanded.

14. The method of claim 10 or claim 11 or claim 12 or claim 13, wherein:

said process fluid is water;

said steam in said pressurized purge stream is at a higher pressure than said process fluid; and said power is extracted from the process fluid in a Rankine cycle including:
pumping said process fluid in a form of liquid condensate to a pressure lower than said purge stream to create pressurized liquid;
vaporizing said pressurized liquid by indirect heat exchange with at least part of said condensing purge steam in a reboiler-condenser;
superheating said process fluid;
expanding said process stream after having been superheated in a steam turbine and extracting said power from shaft work created in said turbine; and
condensing the process fluid after having been expanded to produce said liquid condensate.

15. The method of claim 14, wherein:

said pressurized purge stream is made up of at least recycled water to form a water stream;

said water stream is vaporized and superheated to form said pressurized purge stream;

at least a portion of the heat required for the vaporization and superheating of said water stream is provided by combustion of fuel in a boiler-superheater; and said process fluid is superheated by the combustion of fuel within the boiler-superheater.

16. The method of claim 14, wherein:

water is pumped, vaporized, and superheated to form said pressurized purge stream; and said pressurized purge stream is expanded in a turbine to produce additional power;

after expansion, the pressurized purge stream is reheated and used to purge at the anode side of the at least one oxygen transport membrane; and said pressurized purge stream is indirectly heated along with said first subsidiary air stream by said oxygen product stream.

17. The method of claim 16 wherein:

fuel is added to said pressurized purge stream after having been expanded;

the pressurized purge stream is introduced into said oxygen transport membrane combustor deoxo unit as a reactive purge to produce heat and products of combustion which together with steam contained in said pressurized purge stream are used to purge the anode side of the at least one oxygen transport membrane.

18. The method of claim 14 wherein said steam turbine operates at an exhaust pressure of less than about 14.7 psia.

19. The method of claim 14 wherein at least a portion of the heat for vaporizing and superheating said purge steam is provided by recovery of heat from an exhaust of said gas expander.

* * * * *